United States Patent [19]
Futamura

[11] Patent Number: 5,840,137
[45] Date of Patent: Nov. 24, 1998

[54] PNEUMATIC TIRE WITH IMPROVED SNOW AND ICE TRACTION

[75] Inventor: Shingo Futamura, Wadsworth, Ohio

[73] Assignee: Bridgestone Corporation, Tokyo, Japan

[21] Appl. No.: 430,578

[22] Filed: Apr. 28, 1995

Related U.S. Application Data

[62] Division of Ser. No. 983,190, Nov. 30, 1992, abandoned.

[51] Int. Cl.$^6$ ........................................... B60C 11/00
[52] U.S. Cl. ........................................... 152/209 R
[58] Field of Search ........................ 152/209 R, 209 D; 428/495, 519, 213, 215, 217

[56] References Cited

U.S. PATENT DOCUMENTS

| | | |
|---|---|---|
| 1,719,628 | 7/1929 | Sloman . |
| 3,475,205 | 10/1969 | Byers ........................................ 117/139 |
| 4,284,115 | 8/1981 | Ohnishi ................................. 152/209 R |
| 4,478,266 | 10/1984 | Pierson et al. ........................ 152/209 R |
| 4,519,431 | 5/1985 | Yoshimura et al. ................. 152/209 R |
| 4,619,300 | 10/1986 | Tokunaga et al. .................... 152/209 R |
| 4,640,952 | 2/1987 | Takiguchi et al. ........................ 524/296 |
| 4,667,719 | 5/1987 | Masuda ................................ 152/209 R |
| 4,862,934 | 9/1989 | Yamazaki ............................. 152/209 R |
| 5,176,765 | 1/1993 | Yamaguchi et al. ................. 152/209 R |

FOREIGN PATENT DOCUMENTS

| | | |
|---|---|---|
| 0 341 187 A2 | 11/1989 | European Pat. Off. . |
| 59-59504 | 4/1984 | Japan . |
| 59-160603 | 9/1984 | Japan . |
| 60-31547 | 2/1985 | Japan . |
| 2-127102 | 11/1988 | Japan . |
| 4-15107 | 5/1990 | Japan . |
| 2 150 509 | 7/1985 | United Kingdom . |

OTHER PUBLICATIONS

One page Abstract of Japanese Patent No. A 59124411 to Tomohiko et al., Jul. 18, 1984.
One page Abstract of Japanese Patent No. A60166506 to Jiyunichi, Aug. 29, 1985.
European Search Report dated Mar. 8, 1994 for Application No. EP 93 11 9191.

*Primary Examiner*—Geoffrey L. Knable
*Attorney, Agent, or Firm*—Frank J. Troy, Sr.

[57] ABSTRACT

A composite tread structure (22) comprises a low modulus at −20° C. rubber outer layer (23) and a high modulus at −20° C. rubber inner layer (24), thicker than the outer layer. The outer layer is preferably made from a rubber having a glass transition temperature lower than the glass transition temperature of the rubber comprising the inner layer. Such a tire generally improves snow and ice handling and maintains good wet and dry traction. A pneumatic tire (10) having improved snow and ice traction employs a composite tread (22) comprising a low modulus at −20° C. rubber outer layer component (23) and a high modulus at −20° C. rubber inner layer rubber component (24), thicker than the outer layer component. Finally, a method for improving the snow and ice traction of pneumatic tires comprises the step of applying to the tire carcass prior to curing, a composite tread comprising a low modulus at −20° C. rubber outer layer component and a high modulus at −20° C. rubber inner layer component, thicker than the outer layer component.

8 Claims, 2 Drawing Sheets

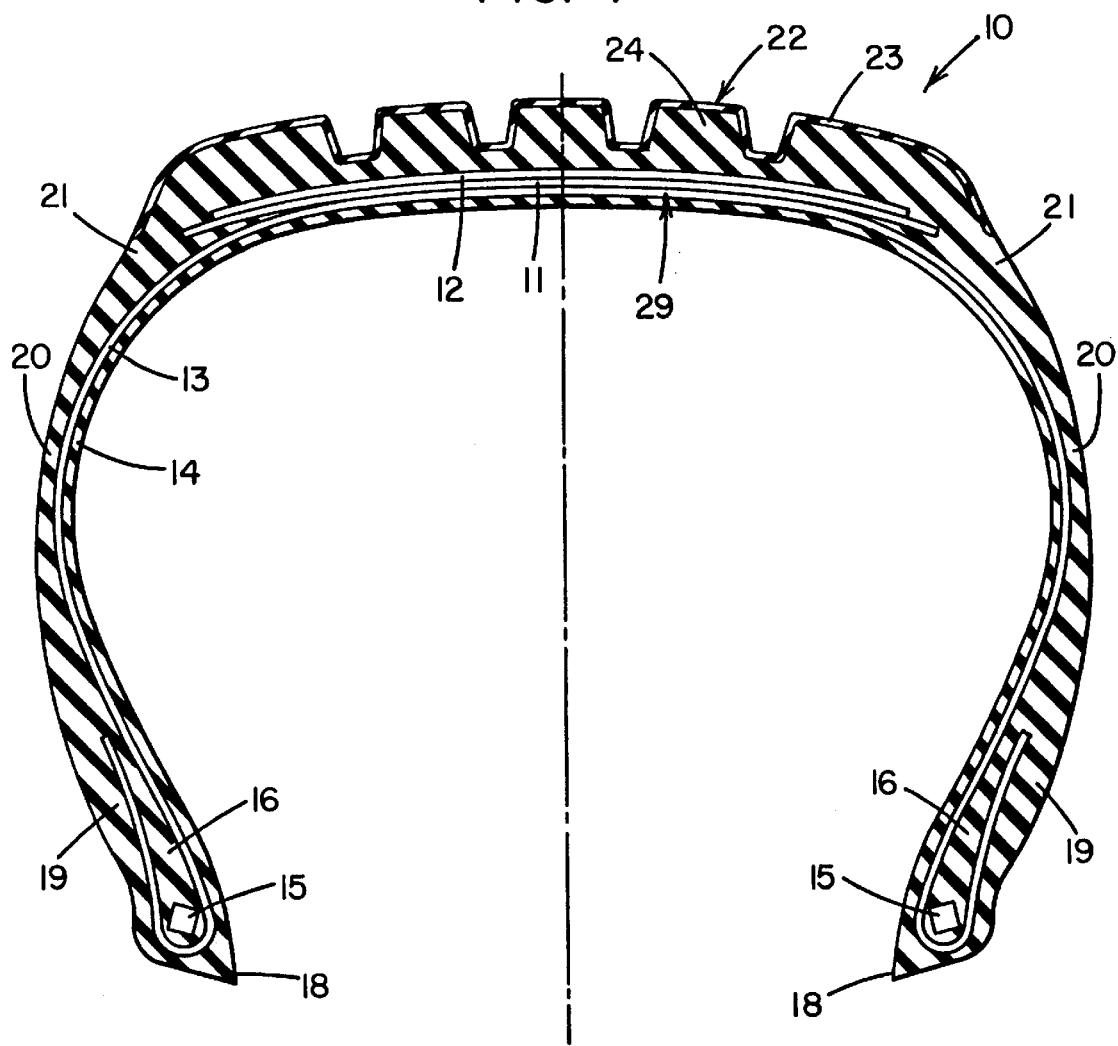

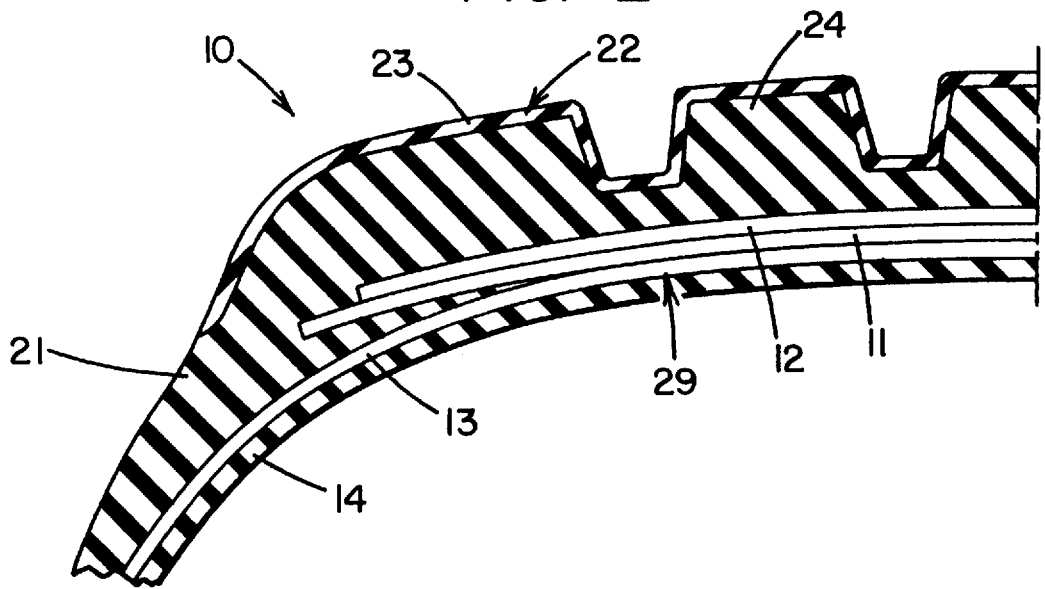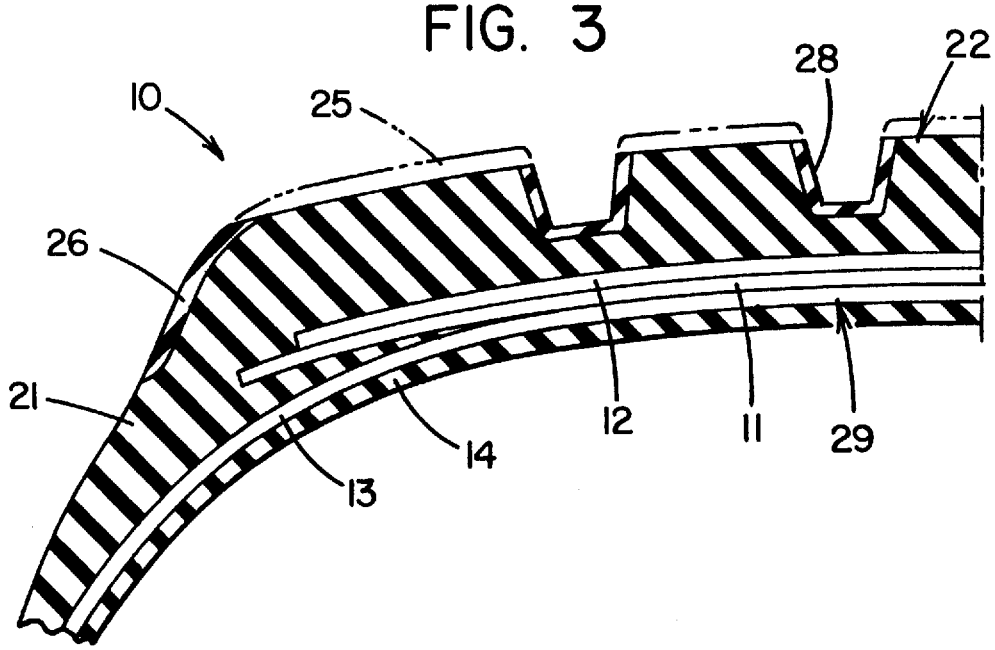

5,840,137

PNEUMATIC TIRE WITH IMPROVED SNOW AND ICE TRACTION

This application is a division of application Ser. No. 07/983,190, filed Nov. 30, 1992 now abandoned.

TECHNICAL FIELD

The present invention is related to the field of pneumatic tires. More particularly, the invention relates to high performance pneumatic tires having good wet and dry handling characteristics and improved snow and ice traction. Specifically, this invention relates to pneumatic tires having a composite tread structure which comprises a thin, low modulus outer layer that improves snow and ice traction and a core, high modulus inner layer for maintaining wet and dry handling.

BACKGROUND OF THE INVENTION

Heretofore, pneumatic tires with good snow and ice traction have been well known in the marketplace. For example, U.S. Pat. No. 3,475,205 sought to reduce the slippage and skidding of rubber surfaces on ice, thereby increasing the traction of the vehicular tire, by incorporating anti-skid agents such as sulfur, selenium, and manganese dioxide into the tread composition.

While such anti-skid agents may have been effective, the more practical manner in which to improve snow and ice traction has been through the proper selection of tread material. Tread materials such as natural rubber or other rubber having a low glass transition temperature (Tg) have been known to be particularly effective in providing traction in snow and ice. However, while these tread materials may provide good handling characteristics in snow and ice, it has long been known that they do not provide very good wet and dry traction. Thus, tires having tread materials of low Tg rubber often sacrifice good wet and dry traction for improved snow and ice traction.

For good wet and dry traction and handling, a tread material of high modulus and high glass transition temperature (Tg) rubber, such as styrene-butadiene rubber (SBR), is commonly used. However, this kind of tread material usually exhibits poorer snow and ice handling characteristics, and therefore, is not effective in all weather conditions.

It is also well known to make tires which have a composite tread structure. Basically, a composite tread uses two different tread materials geometrically arranged within the tire to provide a tread with better characteristics than would normally be achieved with one tread material in the tire. For example, U.S. Pat. No. 4,478,266 shows a composite tread for a vehicle tire which exhibits good traction and reduced rolling resistance upon wear. The composite tread has a low hysteresis component and a high hysteresis component arranged therein such that, upon wear, generally more of the high hysteresis component is exposed to impart better traction to the life of the tread. This patent does not suggest how to improve snow and ice traction, while maintaining significant wet and dry traction, however.

Therefore, a need exists for an effective composite tread structure which will improve the snow and ice traction of a pneumatic tire and still maintain consistent traction in wet and dry conditions.

SUMMARY OF INVENTION

It is therefore, an object of the present invention to provide a tire having a composite tread structure which improves snow and ice handling performance of the tire.

It is another object of the present invention to provide a tire having a composite tread structure which improves snow and ice traction, while maintaining excellent wet and dry handling characteristics for the tire.

It is yet another object of the present invention to provide a tire having a composite tread structure showing excellent wet and dry traction as well as excellent snow and ice traction even after the tire has been worn.

It is still another object to provide a method for improving the snow and ice traction of pneumatic tires, while maintaining excellent wet and dry handling characteristics.

At least one or more of the foregoing objects, together with the advantages thereof over the existing art, which shall become apparent from the specification which follows, are accomplished by the invention as hereinafter described and claimed.

In general, the present invention provides a composite tread structure comprising a low modulus at −20° C. rubber outer layer component and a high modulus at −20° C. rubber inner layer component which is thicker than the outer layer component.

The present invention also provides a pneumatic tire having improved ice and snow traction which employs a composite tread comprising a low modulus at −20° C. rubber outer layer component and a high modulus at −20° C. rubber inner layer component that is thicker than the outer layer component.

The present invention also includes a method for improving the snow and ice traction of pneumatic tires comprising the step of applying to the tire carcass prior to curing, a composite tread comprising a low modulus at −20° C. rubber outer layer component and a high modulus at −20° C. rubber inner layer component, thicker than the outer layer component.

BRIEF DESCRIPTION OF THE DRAWINGS

FIG. 1 is a sectional view of a tire having a composite tread structure according to the present invention;

FIG. 2 is an enlarged fragmentary sectional view depicting the composite tread in greater detail; and FIG. 3 is an enlarged fragmentary sectional view, similar to FIG. 2, but with some of the tread substantially worn.

PREFERRED EMBODIMENT FOR CARRYING OUT THE INVENTION

As noted hereinabove, tire manufacturers of previous pneumatic tires have attempted to improve traction in snow and ice in a variety of ways. It has been known that snow and ice traction may be improved by the proper selection of tread material, but until now, this was done at the sacrifice of dry and wet traction. Conversely, a high performance tire with superior handling and excellent wet and dry traction has usually lacked good snow and ice traction. The present invention provides for improved snow and ice traction while maintaining excellent wet and dry traction and handling. The phrase, snow and ice traction is used loosely herein to describe the traction in the mixture of snow and ice that is likely to be present on the road.

The snow and ice handling characteristics of the tire of the present invention is significantly enhanced by the use of a composite tread structure. More specifically, improved snow and ice traction of pneumatic tires is accomplished by introducing a layered structure onto the tread section of the tires. Importantly, this improved handling of the tire in snow and ice is achieved with very little reduction in the effectiveness of the tire's wet and dry traction, even after the tread is worn. Hence, the tire of the present invention achieves a better balance between snow and ice traction and wet and dry skid resistance than other conventional tires.

As depicted in FIG. I of the attached drawings, a tire of the present invention, as generally indicated by the numeral 10, is shown in section. Tire 10 is typically pneumatic and comprises tread reinforcing belts 11, 12, body ply 13, inner liner 14, bead 15, first bead apex 16, bead toe 18, second bead apex 19, sidewall 20 and shoulder 21. Because the tire design can vary, it is to be understood that the present invention is not to be limited by the construction of any particular tire, or to pneumatic tires as opposed to solid tires.

In the manufacture of a conventional tire, a tread is customarily provided. In the present invention, tire 10 is provided with a composite tread 22 which is made of at least two distinguishable materials. More particularly, the composite tread 22 includes a thin outer layer 23 and a core inner layer 24. Notably, the composition of the thin outer layer 23 has physical properties different from those of the inner layer 24.

The outer layer 23, according to the present invention, preferably comprises a rubber composition which is effective in enhancing snow and ice traction. Such a composition generally has a low modulus at −20° C. and includes a low glass transition temperature (Tg) rubber. Suitable rubber compositions include natural rubber or high cis-polybutadiene, as well as styrene butadiene rubber, and mixtures thereof.

In contrast, the core inner layer 24 of the present invention preferably has a high modulus at −20° C. and includes a high glass transition temperature (Tg) rubber. Such rubber compositions have been shown to have excellent wet skid resistance. An example of such a composition is high styrene SBR (styrene butadiene rubber) which is the preferred rubber composition for the inner layer of the subject invention. Other high Tg rubber compositions useful in the present invention include high vinyl polybutadiene rubber, high vinyl SBR, butyl rubber and blends thereof as well as with other rubbers including natural rubber.

With respect to the modulus of the tread layers, it has been found for practice of the present invention that a thin outer layer 23 whose modulus at −20° C. is at least 30 percent, and preferably 50 percent, lower than the modulus of inner layer 24 at the same temperature is useful in the present invention. The lower modulus outer layer 23 is believed to be particularly effective in improving snow and ice traction, while the high modulus inner layer 24 appears to affect the wet and dry handling and traction of tire 10.

In addition, the average Tg of the rubber in the tread compound of outer layer 14 is preferably lower than the average Tg of the rubber in the inner layer compound. Specifically, the average Tg of the rubber of the outer layer 23 is desirably at least 10° C. lower than the average Tg of the rubber in the inner layer 24 and can be up to about 30° C. lower. The average Tg of the high modulus rubber of the inner layer 24 is preferably higher than −60° C., desirably higher than −50° C. and most desirably higher than −40° C.

Generally, the outer layer 23 of the composite tread has a thickness from about 0.01 inches to about 0.25 inches. However, it is preferred that the thickness of the outer layer range from about 0.02 inches to about 0.20 inches, and even more desirably, from about 0.03 inches to about 0.15 inches.

As shown in FIG. 3, even upon wear, tire 10 of the present invention will still have improved snow and ice traction because, although the thin outer layer 23 may be worn away at the outermost portion of the treads as at 25, there is still sufficient outer layer tread material along the sides 26 of the tread structure 22, and within the grooves 28 of tire 10, to achieve relatively good snow and ice traction. As for wet and dry traction, it will be appreciated that as more of the high modulus, high Tg rubber is exposed, the traction will tend to improve with the life of the tire, somewhat compensating for tread wear. Therefore, both snow and ice traction and wet and dry traction are maintained throughout the life of the tire 10.

Tire 10 is of substantially conventional design and is essentially produced as is known in the art. The composite tread 22 of a tire 10 is made by placing the two layers 23 and 24 onto the body plies 29 and molding the tire in the conventional manner.

In order to exemplify practice of the invention, tires having composite tread structures made according to the concepts of the present invention were molded and tested for snow traction and handling. Specifically, a low modulus natural rubber/SBR blend, presented as Compound No. 1 in Table I, was employed as the outer layer component 23 for the composite tread of the tires. A high performance tread was selected as the high modulus inner layer component. The inner layer component 24, included a high Tg rubber, and was considered to provide excellent wet and dry traction, but had rather poor snow and ice traction. A high performance tread composition similar to the inner layer component actually employed in the tests is presented as Compound 2 in Table I.

TABLE I

TREAD COMPOUND COMPOSITIONS

| Ingredients | Compound 1 | Compound 2 |
|---|---|---|
| SBR 1 | 75 | — |
| SBR 2 | — | 100 |
| NR | 25 | — |
| ZnO | 3.0 | 3.0 |
| Stearic Acid | 2.0 | 2.0 |
| Antioxidant | 1.0 | 1.0 |
| Aromatic Oil | 20 | 10.5 |
| Wax | 0.75 | 1.0 |
| Carbon black | 40 | 48.5 |
| Sulfur | 1.8 | 1.5 |
| Sulfenamide | 0.5 | 0.75 |
| Morpholine Disulfide | 0.5 | — |
| Benzothiazyl Disulfide | — | 0.25 |

The SBR 1 component comprised 35% styrene and 65% butadiene (8% 1,2-structure and 57% 1,4-structure) and had a Tg of −50° C. The SBR 2 component comprised 35% styrene and 65% butadiene (23% 1,2-structure and 42% 1,4-structure) and had a Tg of −35° C.

Data on the pertinent physical properties of the inner layer component and the outer layer component of the composite tread are provided in Table II hereinbelow. The modulus was measured with static compressional stress of 0.45 MPa and dynamic sinusoidal stress of ±0.3 MPa imposed on the static stress.

TABLE II

PHYSICAL PROPERTIES FOR THE COMPONENTS
OF THE COMPOSITE TREAD

|  | Modulus at −20° C. | Avg. Tg of rubber |
|---|---|---|
| Inner layer component (Compound 2) | 61 MPa | −35° C. |
| Outer layer component (Compound 1) | 13 MPa | −55° C. |

The modulus at −20° C. of the core inner layer component was 61 MPa while the modulus at the same temperature for the outer layer component was 13 MPa. Furthermore, the average Tg of the inner layer component was −35° C. as compared to −55° C. for the outer layer component, a difference of 20° C. Thus, the physical properties of the subject compounds fall within the parameters set forth hereinabove for the present invention.

For testing purposes, three different tires were molded and tested for braking ability, acceleration ability, lateral maximum acceleration (acc), and handling in snowy conditions. The test tires have been characterized in Table III hereinbelow.

TABLE III

TIRE TREAD CHARACTERISTICS

| Test Tire | Tire A | Tire B | Tire C |
|---|---|---|---|
| Outer layer employed (inches) | 0.0 | 0.05 | 0.10 |

Each of the three tires, designated A-C, employed a tread core, or inner layer, of high performance tread compound. For testing purposes, the tire treads were built up an additional 0.100 inches as follows: Tire A received two 0.050 inch layers of the high performance tread composition similar to Compound 2 and utilized in the core to provide a Control; Tire B received a tread composite comprising a 0.050 inch high performance inner layer and a 0.050 inch outer layer (Compound 1) and, Tire C received a tread composite comprising two 0.050 inch layers of outer layer material (Compound 1).

The traction and handling data are provided in Table IV hereinbelow.

TABLE IV

SNOW TRACTION AND SNOW HANDLING TESTS

|  | Tire A | Tire B | Tire C |
|---|---|---|---|
| Braking (30–0 mph) |  |  |  |
| Distance (feet) | 112 | 95 | 92 |
| Time (sec.) | 5.20 | 4.38 | 4.38 |
| Acceleration (0–30 mph) |  |  |  |
| Distance (feet) | 268 | 194 | 198 |
| Time (sec.) | 10.47 | 7.96 | 7.88 |
| Lateral Max. Acc (g) | 0.245 | 0.35 | 0.345 |
| Handling |  |  |  |
| linearity | 6.5 | 7.5 | 7.5 |
| over steer | 6.5 | 7.5 | 7.5 |
| recovery | 6.5 | 7.5 | 7.5 |
| steering response | 6.0 | 7.5 | 7.5 |
| overall rating | 6.5 | 7.5 | 7.5 |

TABLE IV-continued

SNOW TRACTION AND SNOW HANDLING TESTS

|  | Tire A | Tire B | Tire C |
|---|---|---|---|
| Comments: | Slow response rear good | Excellent good balance good response | Excellent good balance good response |

Braking ability was tested by driving a car equipped with the specific tires on a medium packed snow surface and measuring the distance and time it took to come to a complete stop from 30 miles per hour. Similarly, acceleration ability was tested by measuring the distance and time required to accelerate from 0 to 30 miles per hour on snow. Lateral maximum acceleration tests were performed by turning the car sharply and measuring the maximum centrifugal force, expressed in units of g (gravitational acceleration, 9.8 m$^2$).

Tests for handling covered linearity, oversteer, recovery and steering response, and included an overall rating. The tires were rated on a scale of 1 (poor) to 10 (superior) for the handling tests described.

As can be determined from the test data presented in Table IV, snow traction and handling were significantly better for the tires which included the low modulus outer layer component (Tires B and C) as compared to the control tire (Tire A) which had only a high modulus layer of tread. Both Tires B and C exhibited excellent response and balance. Tire A, however, showed poorer response.

Next, the tires tested in Table IV hereinabove were buffed. Notably, 0.115 inches of tread material were buffed from each tire to make the tire act as if it had been partially worn. It should be appreciated that by buffing the tires to that extent, the outer layer of the tread had disappeared from the outermost portion of the tread. However, it should be noted that the outer layer had not disappeared completely inasmuch as there was at least some portion of that tread material remaining between the grooves.

Snow traction and handling tests for the Tires A-C were conducted in the same manner as above described and the data reported as follows hereinbelow.

TABLE V

SNOW TRACTION AND SNOW HANDLING TESTS

|  | buffed Tire A | buffed Tire B | buffed Tire C |
|---|---|---|---|
| Braking (30–0 mph) |  |  |  |
| Distance (feet) | 140 | 133 | 129 |
| Time (sec.) | 6.43 | 6.08 | 5.75 |
| Acceleration (0–30 mph) |  |  |  |
| Distance (feet) | 400 | 318 | 306 |
| Time (sec.) | 15.63 | 12.58 | 11.96 |
| Lateral Max. Acc (g) | 0.215 | 0.270 | 0.290 |
| Handling |  |  |  |
| linearity | 4.5 | 5.5 | 6.0 |
| over steer | — | 5.0 | 5.5 |
| recovery | 4.0 | 5.0 | 6.0 |
| steering response | 4.0 | 5.5 | 6.0 |
| overall rating | 4.5 | 5.5 | 6.0 |

TABLE V-continued

SNOW TRACTION AND SNOW HANDLING TESTS

|  | buffed Tire A | buffed Tire B | buffed Tire C |
|---|---|---|---|
| Comments: | Very poor response would not turn | Slightly better steering response | Slow but sure response in turning |

As can be seen from the data presented in Table V, the tires having the low modulus outer layer of Compound 1 (Tires B and C) generally exhibited better snow traction and handling than the control tire (Tire A). The tires having the low modulus outer layer were able to stop more quickly and in a shorter distance than the tires without the particular outer layer. They also exhibited a greater lateral maximum acceleration and better overall handling.

In addition, the buffed Tire A in Table V handled very poorly. In fact, the driver noted that the tires would not turn on the snow. While the buffed tires B and C did not show the same superior handling and traction as when they were new tires, the tires did respond significantly better during the tests.

In conclusion, it should be clear for the foregoing tests and specification that a tire which has a composite tread structure of two different materials enhances both wet and dry handling performance and snow and ice traction.

Thus it should be evident that the composite tread of the present invention is highly effective in both enhancing the snow and ice traction of the subject tire and maintaining the wet and dry handling performance of the same. The invention is particularly suited for use on automotive vehicles which are driven in all kinds of weather, but is not necessarily limited thereto. The composite tread of the present invention, as well as the pneumatic tires of the present invention, can be used separately on other vehicles and wagons which may required all weather traction.

Based upon the foregoing disclosure, it should now be apparent that the use of the composite tread structure described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, rubber compositions of the present invention are not necessarily limited to those noted hereinabove. Other compositions of rubber having similar physical properties to those described above may be substituted therefor. Thus, the scope of the invention shall include all modifications and variations that may fall within the scope of the attached claims.

What is claimed is:

1. A pneumatic tire having a composite tread structure, said composite tread structure providing a road engaging surface and a plurality of grooves and comprising:
   an inner rubber layer providing said road engaging surface and defining said grooves; and
   an outer rubber layer having a thickness in the range of from about 0.01 inches to about 0.25 inches and providing an original road engaging surface, over said inner layer, carried within said grooves and covering said grooves defined within said inner layer, wherein said outer rubber layer provides a low modulus at −20° C. and said inner rubber layer provides a high modulus at −20° C.; said inner layer is thicker than said outer layer; and, the average glass transition temperature of said high modulus rubber is higher than about −60° C., said moduli being measured by the application of compressional stress of 0.45 MPa and dynamic sinusoidal stress of ±0.3 MPa imposed on the static stress and the average glass transition temperature of the rubber in said outer layer is at least 10° C. lower than the average glass transition temperature of the rubber in said inner layer; said outer and inner layers containing synthetic rubber; wherein wet snow and ice traction is provided by said low modulus, lower average glass transition temperature rubber, while said high modulus, higher average glass transition temperature rubber provides wet and dry traction and wherein wet snow and ice traction continues to be provided after said low modulus, lower average glass transition temperature rubber is worn from said road engaging surface.

2. A pneumatic tire having a composite tread structure, as set forth in claim 1, wherein said outer layer has a modulus at −20° C. at least 30% lower than the modulus at −20° C. of said inner layer.

3. A pneumatic tire having a composite tread structure, as set forth in claim 2, wherein said outer layer is from about 0.02 inches to about 0.20 inches thick.

4. A pneumatic tire having a composite tread structure, as set forth in claim 3, wherein said outer layer is from about 0.03 inches to about 0.15 inches thick.

5. A pneumatic tire having a composite tread structure, said composite tread structure providing a road engaging surface and a plurality of grooves and comprising:
   an inner rubber layer providing said road engaging surface and defining said grooves; and
   an outer rubber layer having a thickness in the range of from about 0.01 inches to about 0.25 inches carried within said grooves and covering said grooves defined within said inner layer, wherein said outer rubber layer provides a low modulus at −20° C. and said inner rubber layer provides a high modulus at −20° C.; said inner layer is thicker than said outer layer; and, the average glass transition temperature of said high modulus rubber is higher than about −60° C., said moduli being measured by the application of compressional stress of 0.45 MPa and dynamic sinusoidal stress of ±0.3 MPa imposed on the static stress and the average glass transition temperature of the rubber in said outer layer is at least 10° C. lower than the average glass transition temperature of the rubber in said inner layer; said outer and inner layers containing synthetic rubber; wherein wet snow and ice traction is provided by said low modulus, lower average glass transition temperature rubber, while said high modulus, higher average glass transition temperature rubber provides wet and dry traction and wherein wet snow and ice traction is provided without said low modulus, lower average glass transition temperature rubber being present against said road engaging surface.

6. A pneumatic tire having a composite tread structure, as set forth in claim 5, wherein said outer layer has a modulus at −20° C. at least 30% lower than the modulus at −20° C. of said inner layer.

7. A pneumatic tire having a composite tread structure, as set forth in claim 6, wherein said outer layer is from about 0.02 inches to about 0.20 inches thick.

8. A pneumatic tire having a composite tread structure, as set forth in claim 7, wherein said outer layer is from about 0.03 inches to about 0.15 inches thick.

* * * * *